United States Patent
Mamie

(10) Patent No.: US 7,302,859 B2
(45) Date of Patent: Dec. 4, 2007

(54) DEVICE FOR SHOWING TENSILE STRESS

(75) Inventor: Andre Mamie, Horgen (CH)

(73) Assignee: Spanset Inter AG, Oetwil AM (CH)

( * ) Notice: Subject to any disclaimer, the term of this patent is extended or adjusted under 35 U.S.C. 154(b) by 79 days.

(21) Appl. No.: 10/527,081

(22) PCT Filed: Jun. 13, 2003

(86) PCT No.: PCT/CH03/00385

§ 371 (c)(1),
(2), (4) Date: Oct. 20, 2005

(87) PCT Pub. No.: WO2004/025235

PCT Pub. Date: Mar. 25, 2004

(65) Prior Publication Data

US 2006/0150744 A1     Jul. 13, 2006

(30) Foreign Application Priority Data

Sep. 10, 2002     (CH) .................................. 1536/02

(51) Int. Cl.
*G01N 3/08*     (2006.01)
(52) U.S. Cl. ...................................................... 73/831
(58) Field of Classification Search ............... 73/831
See application file for complete search history.

(56) References Cited

U.S. PATENT DOCUMENTS 5,295,664 A * 3/1994 Kamper ...................... 254/220
6,357,978 B1 * 3/2002 Kamper ...................... 410/100

FOREIGN PATENT DOCUMENTS

| EP | 0984873 B1 | 11/2001 |
| GB | 2223102 A | 10/1992 |
| GB | 2255109 A | 10/1992 |
| WO | WO 98 55341 A | 12/1998 |

OTHER PUBLICATIONS

International Search Report in related application PCT/CH2003/000385, filed Jun. 13, 2003.

* cited by examiner

*Primary Examiner*—Michael Cygan
*Assistant Examiner*—Octavia Davis
(74) *Attorney, Agent, or Firm*—Antonelli, Terry, Stout & Kraus, LLP.

(57) ABSTRACT

In this device for indicating (10) pretensioning forces in a tensioning element (7), such as tie-down straps or tie-down ropes, the spring surrounds the tie bolt (3) which is located on the loop of the tie-down strap, and in response to weak forces describes a path (6) which is easily visible. The combination of two components which differ in shape allows the spring (1) to maintain its shape and spring constant. As a result, the pretensioning force is indicated directly, yet the spring is not subject to an additional load under high tensions but is protected by positive engagement.

11 Claims, 4 Drawing Sheets

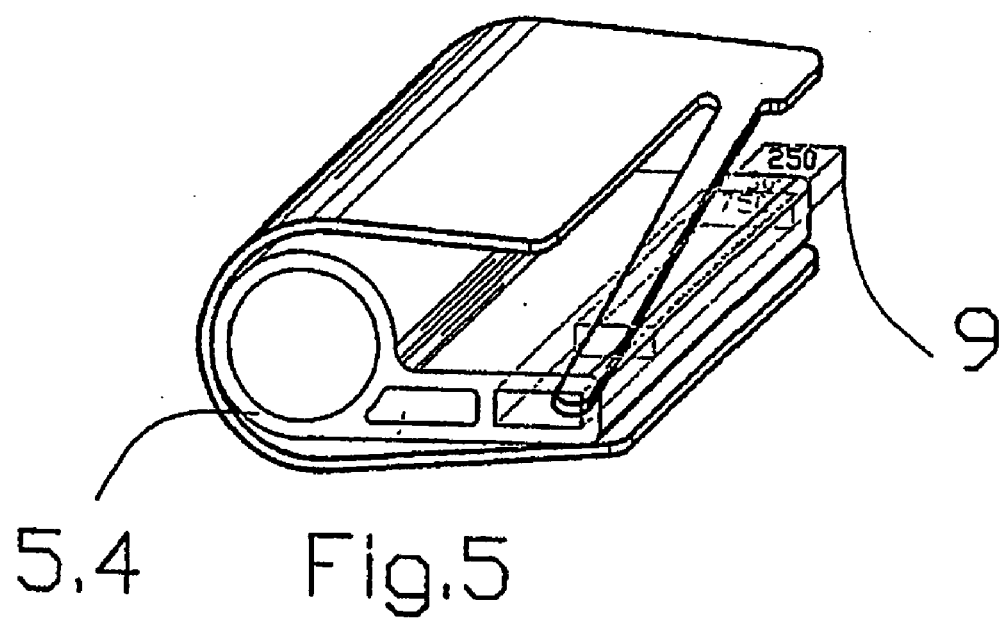
5,4   Fig.5
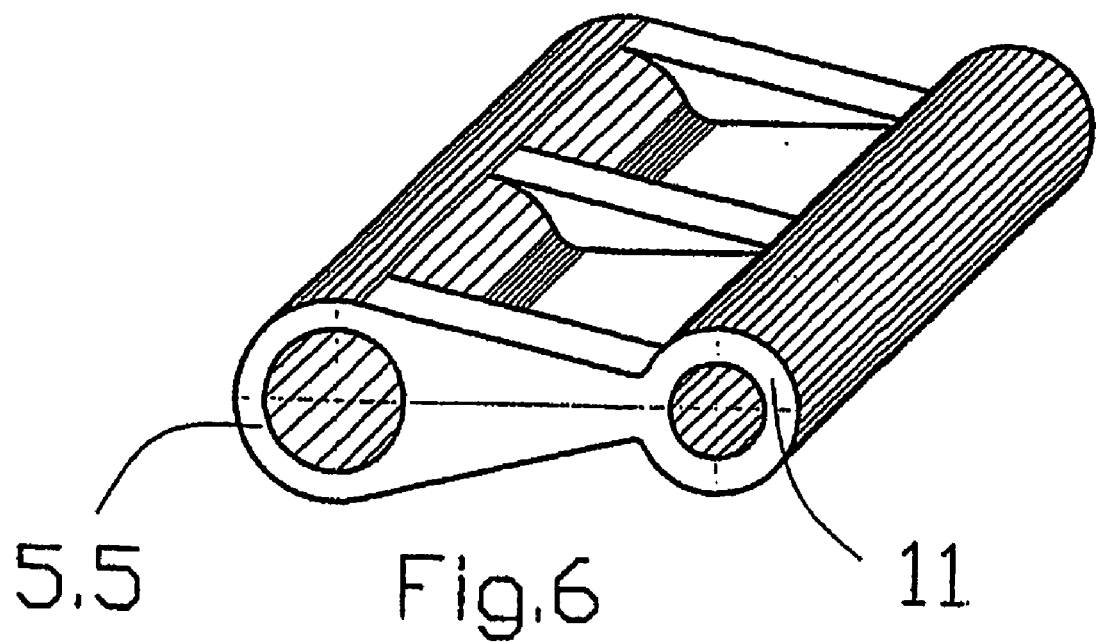
5,5   Fig.6

DEVICE FOR SHOWING TENSILE STRESS

RELATED APPLICATIONS

This application is a U.S. national stage application under 35 U.S.C. §371 of international application PCT/CH2003/000385 filed Jun. 13, 2003, which claims priority under 35 U.S.C. §119 of Switzerland application number 1536/02 filed Sep. 10, 2002.

TECHNICAL FIELD

The invention relates to a device for indicating tension in a tensioning element.

BACKGROUND

Load indicators have been disclosed and described in GB 2 255 109 A having a closed grommet thimble, as well as in GB 2 223 102 A having a type of strain gauge.

Also known as disclosed in EP 0984 873 B1 is a one-piece load indicator in which the tensile forces can be determined by the variable distance of the leg ends of a spring which takes the form of a grommet thimble. Here the spring encloses a tie bolt which is located within a loop of the lashing-down strap and also describes a path which is easily discernible visually under small loads.

A disadvantage of this approach is that under high tensile forces the shape of the spring changes geometrically such that this increased force is no longer discernible visually but must be measured using an additional amplification.

All known measuring devices and load indicators of this type are located inside the loop of the tie-down strap or lifting sling. Load indicators of the same type and for the same technical means can be attached externally, thereby pressing on the outer faces of the loop. In this case, the inner faces of the loop are in contact at zero tension and are then forced further apart as the tension increases, in other words, exhibit a reversed functional principle.

The goal of the known load indicators is to measure the entire range of the load, and ought therefore to have the ability to accommodate both low and high forces through the spring force. In the existing devices, high forces are accommodated by using a heavy material or by a small movement in the spring elements. In order to be able to measure the low forces that occur in response to a pretension, a weak spring is therefore required which is at the same time able to withstand a high tensile force. Practical experience has demonstrated that weak springs undergo changes in shape when overtensioned, thereby displaying incorrect values from that point on. In solving the task at hand, the approach is therefore to limit oneself to the tension and to ignore any forces exceeding this value.

SUMMARY OF THE INVENTION

The goal of the invention is to design a pretension indicator for indicating tension in a tensioning element such that a result is displayed in response to weak forces, and that the geometry of the spring, and thus the spring constant, is preserved when high forces are applied, and such that the movement of the spring is precisely limited to the range of the specified force. The terms spring constant and spring rate refer to properties of the element, specifically, spring thickness and spring geometry.

The principal application of this device relates to securing a load, enabling the user to read off the tension generated in order to implement an appropriate tie-down of the load. When a load settles, there can also be a loss of the pretension which can also be read from this indicator.

This goal is achieved according to the invention disclosed herein. The solution is based on a combination of two elements which are interactively linked, wherein, on the one hand, small forces are displayed in the tensioned system and, on the other hand, the allowable pretension is indicated by a positive-engaging end position. The spring constant of the spring is dimensioned such that the force to be detected is directly readable. In order to ensure that the spring does not change shape when this force is exceeded, the path of the spring is restricted by a formed piece. The positive engagement of the elastic spring with the elastic formed piece is capable of accommodating a multiple of the displayed force. By exploiting the different properties of these components, the combination of two or more components allows for both simplified fabrication and tolerance in the fabrication technique by incorporating prefabricated components in the production process. The function of each individual component is thus restricted to an essential range, thereby ensuring that its function is performed in an optimal manner. The attachment of additional functions does not overload the individual component; instead, these functions can be reliably implemented using the material which is readily able to take on this function.

The following discussion explains the invention in more detail based on specific embodiments.

BRIEF DESCRIPTION OF DRAWINGS

FIG. 5 shows a variant of a loose combination which provides a display on the side;

FIG. 6 shows a positive-engaging component in the form of an injection-molded variant with an additional centering means.

DETAILED DESCRIPTION

Figure 1:
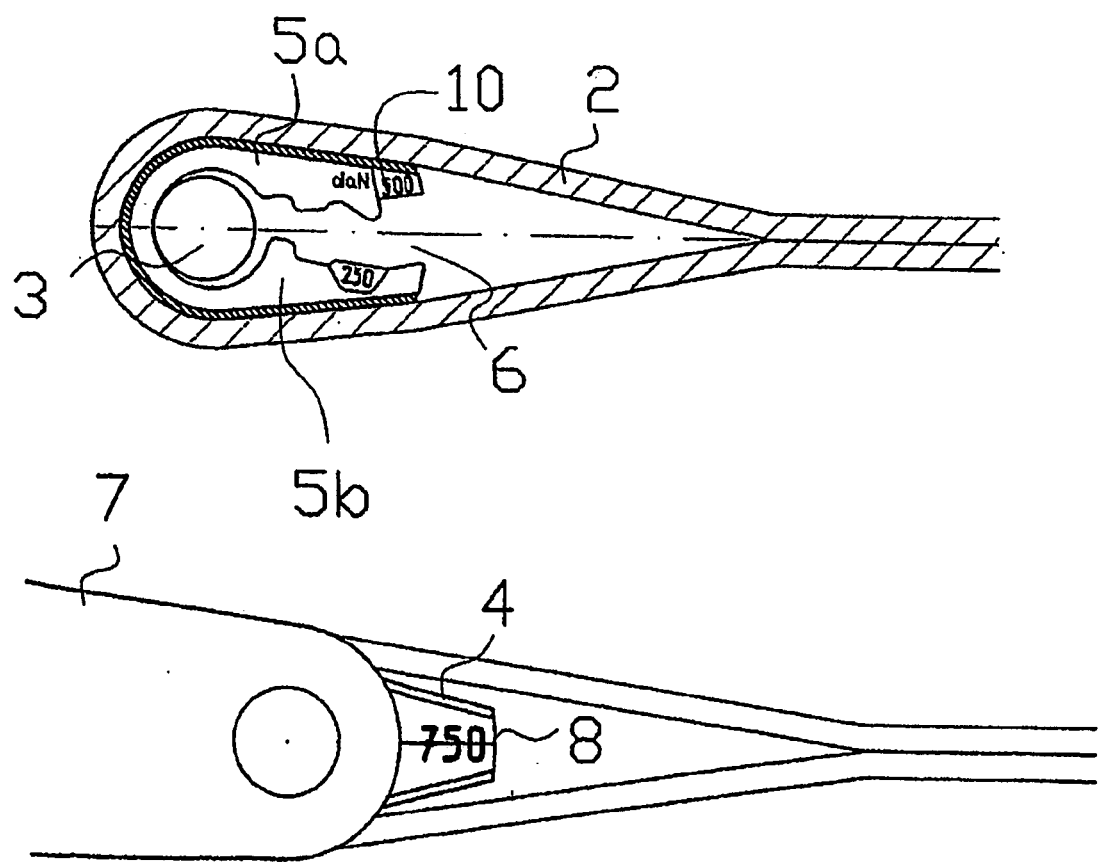
FIG. 1 shows the functional principle of the pretension indicator having a pressure-controlled deformable formed piece.

FIG. 1 shows a spring (1) which surrounds a deformable formed piece (5) and which expands the inner sides of the loop (2) when under zero tension. Spring (1) and formed piece (5) form a unit such that the two elements perform the same movements. Under tensile load from the tensioning element (7) through the bolt (3), the inner sides of loop (2) press on the combination of spring (1) and formed piece (5), and move legs (5a) and (5b) of formed piece (5) towards each other. Once the allowable pretension has been reached, end position (8), that is, legs (5a) and (5b) of formed piece (5), contact each other in a positive engaging manner such that no further movement of spring (1) and formed piece (5) is possible. The pretension attained is now easily read via dimensional indicator (10).

Figure 2:
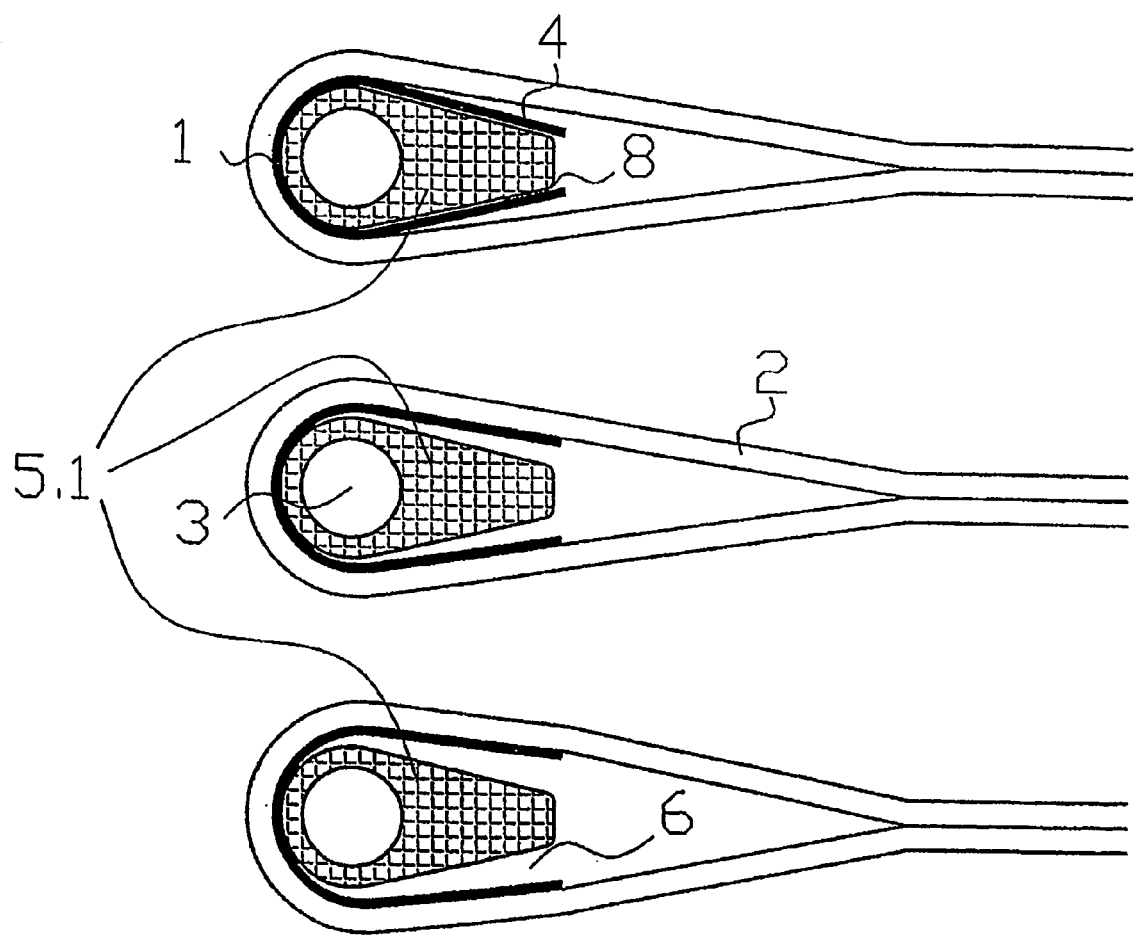
FIG. 2 shows the functional principle of the pretension indicator having a dimensionally stable formed piece.

FIG. 2 shows a spring (1) having a dimensionally stable formed piece (5.1). In this design, the tensile load is indicated exclusively by dimensional indicator (6) in response to the spring force of spring (1) acting through the legs (4) of the spring. Here again, due to the positive engagement of spring (1) and formed piece (5.1) when end position (8) is reached, formed piece (1) prevents any overtensioning of spring (1).

Figures 3, 4:
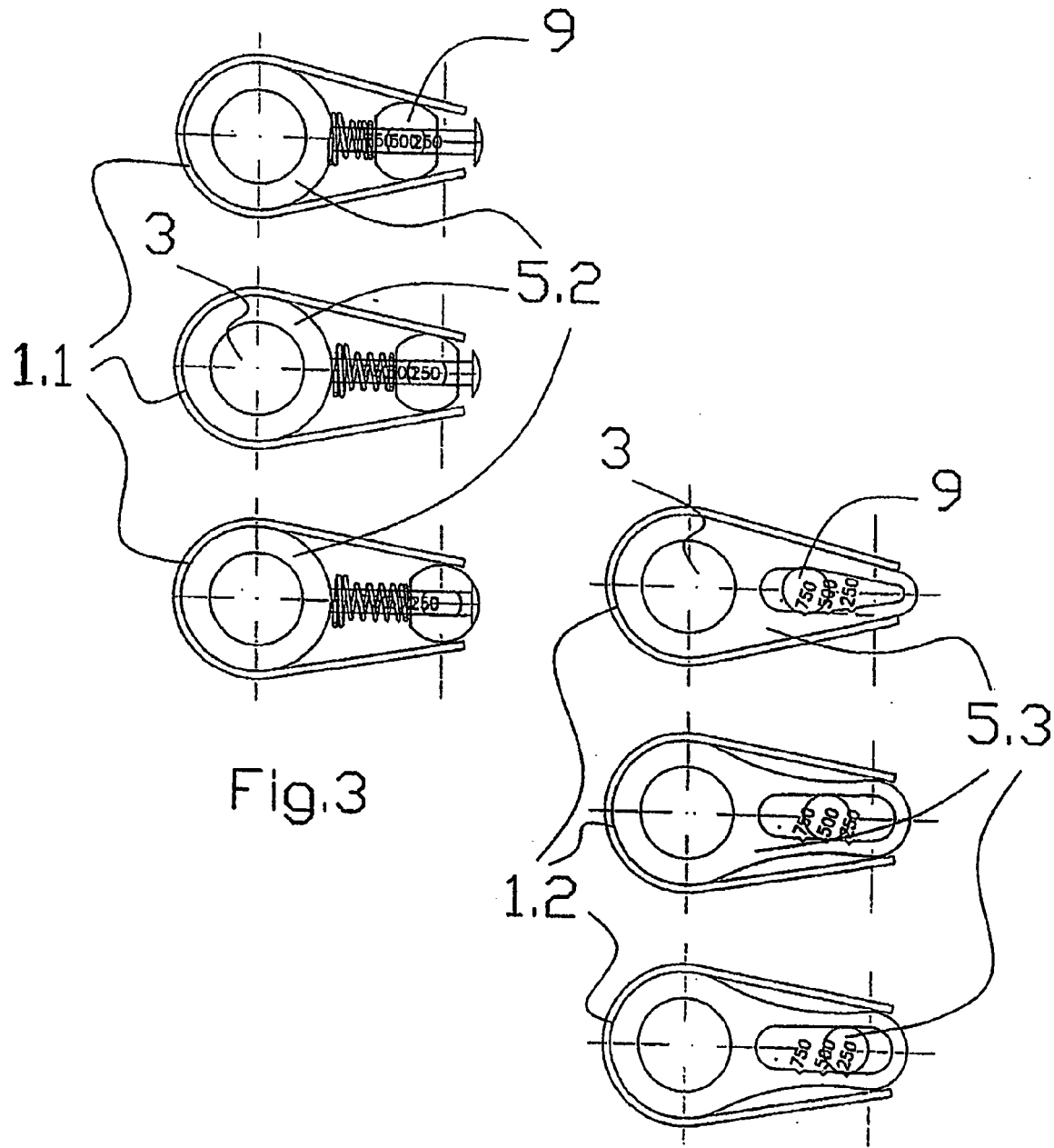
FIG. 3 shows a variant of an additional spring which presses the dimensional indicator onto the legs of the spring, and displaces the spring rearward when under tension.
FIG. 4 shows a variant of an elastic formed piece which deflects the dimensional indicator.

FIG. 3 shows a load indicator in which under tensile load the leg ends of the spring (1.1) move the indicating element (9) horizontally against a spring onto the formed piece (5.2) in the direction of bolt (3). The spring force here can be set for the specific maximum pretension.

FIG. 4 shows a load indicator in which the leg ends of the spring (1.2) press against an elastic formed part (5.3), thereby moving indicating element (9) through a tapering gap in the direction of bolt (3).

FIG. 5 shows the same functional principle, but with a side indicator which displaces the indicating element (9) transversely out of formed piece (5.4).

FIG. 6 shows a formed piece (5.5) in the form of an injection-molded piece having an additional centering means (11), which piece can be employed as in FIG. 2.

The invention claimed is:

1. Device for indicating tension in tension means, the device comprising:
   a spring which is reversely curved to form a closed end and two opposed legs extending from the closed end such that in use the spring is placed around a rigid web which forms a connection between a strap and tension means, and is surrounded in a streamlined shape by a formed loop of the strap;
   wherein the device allows for a recoverable deformation of the spring under tension and for a scale on which the tension can be read;
   a formed piece with a shape to be placed around the rigid web with the spring surrounding the formed piece at least in the bite of the loop at the closed end of the spring, the spring being combined with the formed piece in a positively engaging manner such that the tension of the tension means deforms the spring up to an end position determined by the formed piece within a lower range, and such that the tension does not further deform the spring in a second upper range of the tension since the spring contacts the formed piece in the end position—with the result that there is no overtension, and thus no change in the spring constant of the spring and in a predetermined indication range.

2. Device according to claim 1, wherein the combination of the spring and the formed piece is a device in which the individual parts are both rigidly anchored.

3. Device according to claim 1, wherein the formed piece has two legs and is deformable in a pressure-dependent manner until reaching the positive-engaging end position, the formed piece following the movement of the spring, and that based on the changing position of the two legs of the formed piece the respective pretensioning force is readable by means of a dimensional indicator.

4. Device according to claim 1, wherein the formed piece is designed to be dimensionally stable independently of the pressure.

5. Device according to claim 1, wherein the spring and the formed piece are fabricated out of different materials.

6. Device according to claim 1, wherein the spring encloses the formed piece, so as to bring about a rigid anchoring between the two components.

7. Device according to claim 1, wherein the formed piece includes dimensional indicators which are one of directly engraved or mounted on the formed piece as separate components.

8. Device according to claim 1, wherein the formed piece has mounted thereon a movable component which is displaced along a track by the motion of the spring so as to produce an expanded indication range.

9. Use of the device according to claim 1 for tension means selected from the group consisting of ratchets and shackles.

10. Device according to claim 1, wherein the combination of the spring and the formed piece is a device in which the individual parts are both loose.

11. Device according to claim 5, wherein the spring and the formed piece are fabricated out of, respectively, spring steel and plastic.

* * * * *